(12) United States Patent
Lescure et al.

(10) Patent No.: US 8,049,825 B2
(45) Date of Patent: Nov. 1, 2011

(54) LASER PROJECTION SOURCE WITH BIREFRINGENT WEDGE FOR SPECKLE REDUCTION

(75) Inventors: Alban N. Lescure, Redmond, WA (US);
Markus Duelli, Seattle, WA (US); Mark O. Freeman, Snohomish, WA (US)

(73) Assignee: Microvision, Inc., Redmond, WA (US)

( * ) Notice: Subject to any disclaimer, the term of this patent is extended or adjusted under 35 U.S.C. 154(b) by 358 days.

(21) Appl. No.: 12/424,951

(22) Filed: Apr. 16, 2009

(65) Prior Publication Data

US 2010/0265466 A1    Oct. 21, 2010

(51) Int. Cl.
*G02F 1/1335*     (2006.01)
(52) U.S. Cl. .......................................................... 349/10
(58) Field of Classification Search .................. None
See application file for complete search history.

(56) References Cited

U.S. PATENT DOCUMENTS

| | | | |
|---|---|---|---|
| 2008/0158513 A1 | 7/2008 | Bartlett et al. | |
| 2009/0034041 A1* | 2/2009 | Grasser | 359/204 |
| 2009/0161072 A1* | 6/2009 | Yamauchi et al. | 353/20 |
| 2010/0079848 A1* | 4/2010 | Grasser et al. | 359/291 |
| 2011/0037953 A1* | 2/2011 | Nizani et al. | 353/38 |

OTHER PUBLICATIONS

Dingel, Benjamin et al., "Speckle-Free Image in a Laser Diode Microscope by Using the Optical Feedback Effect", *Optical Letters*, vol. 18, No. 7 Apr. 1, 1993, 549-551.

Jones, R. J. et al., "Influence on External Cavity Length on the Coherence Collapse Regime in Laser Diodes Subject to Optical Feedback", *IEE Proc-Optoelectron*, vol. 148, No. 1, Feb. 1, 2001, 7-12.

Trisnadi, Jahja I. et al., "Speckle Contrast Reduction in Laser Projection Displays", *SPIE* vol. 4657 Apr. 26, 2002.

Volker, A.C. et al., "Laser Speckle Imaging with An Active Noise Reduction Scheme", *Optics Express*, vol. 13, No. 24, Nov. 15, 2005, 9782-9787.

Woodward, S. L. et al., "The Onset of Coherence Collapse in DBR Lasers",*IEEE Photonics Technology Letters*, vol. 2, No. 6 Jun. 1, 1990, 391-394.

* cited by examiner

*Primary Examiner* — Sung Pak
(74) *Attorney, Agent, or Firm* — Kevin D. Wills

(57) ABSTRACT

An imaging system (200), such as a scanned laser projection system, includes one or more laser sources (201) configured to produce one or more light beams (204), and a light modulator (203) configured to produce images (206) from the light beams (204). Optional optical alignment devices (220) can be used to orient the light beams (204) into a combined light beam (205). A birefringent wedge (221) is disposed between at least one of the laser sources (201) and the light modulator (203). The birefringent wedge (221) is configured to receive light from the laser sources (201) and deliver two angularly separated and orthogonally polarized light beams (223) to the light modulator (203) so as to reduce speckle appearing when the images (206) are displayed on a display surface (207). An optional glass wedge (1004) can be used to correct optical path deviation (1001) introduced by the birefringent wedge (221).

14 Claims, 9 Drawing Sheets

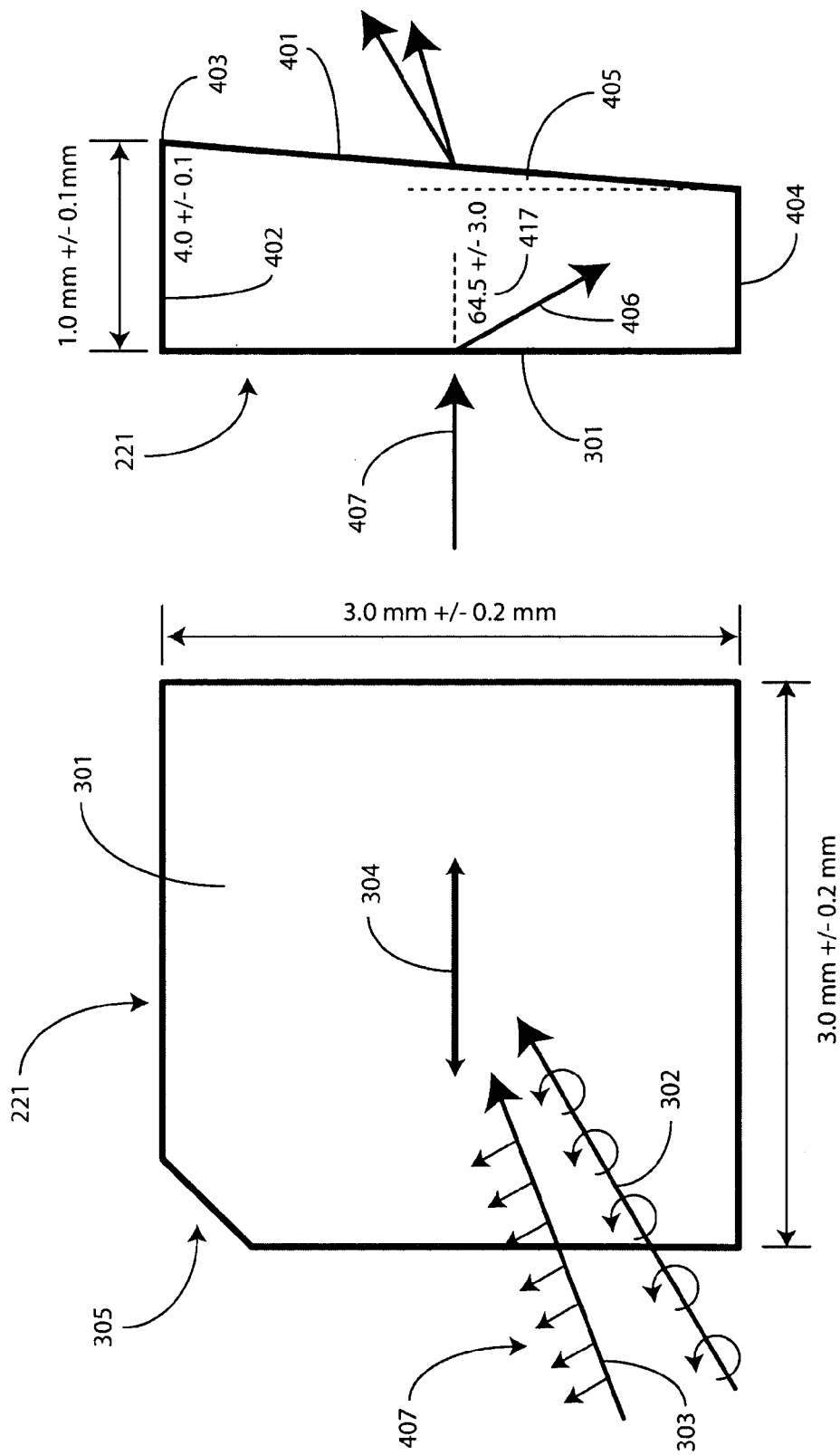

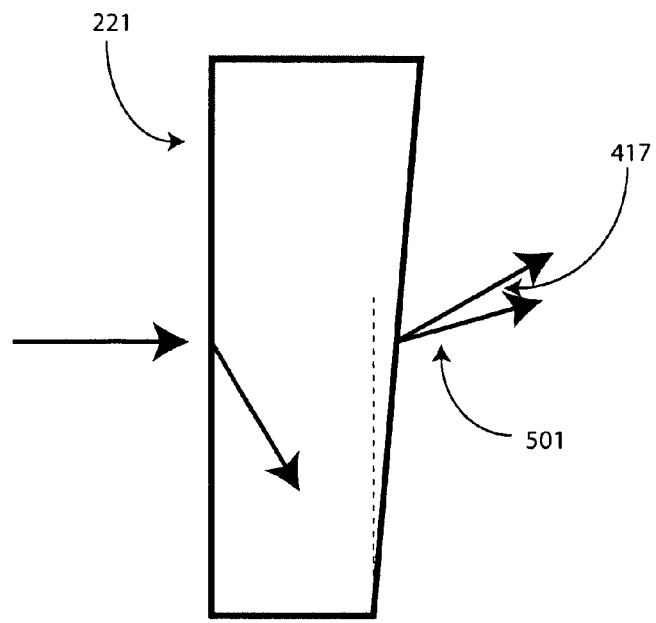
FIG. 5
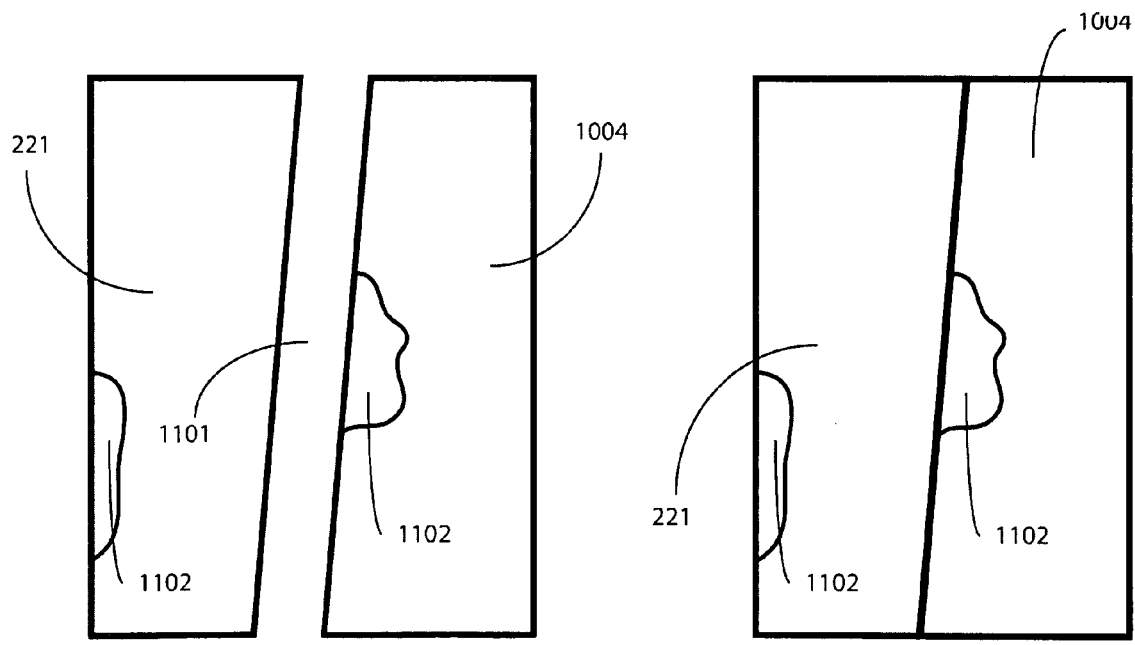
FIG. 11  FIG. 12

LASER PROJECTION SOURCE WITH BIREFRINGENT WEDGE FOR SPECKLE REDUCTION

BACKGROUND

1. Technical Field

This invention relates generally to optical projection systems configured to reduce perceived speckle, and more particularly to a laser-based system employing a birefringent wedge in the optical path of one or more lasers to create angularly separated and orthogonally polarized beams from a single laser prior to forming an image, thereby reducing speckle perceived by a viewer.

2. Background Art

Laser projection devices facilitate the production of brilliant images created with vibrant colors. The image quality associated with laser-based projection systems is unmatched by systems using conventional projection devices. The advent of semiconductor lasers, such as laser diodes, allows these brilliant images to be created by a compact projector, at a reasonable cost, and while consuming small amounts of power. Laser diodes are small, compact, and relatively inexpensive. Further, the light from laser diodes is easily modulated to form bright, complex images.

One practical drawback associated with using lasers in projection systems is the image artifact known as "speckle." Speckle occurs when a coherent light source is projected onto a randomly diffusing surface. As the light is highly coherent, when it reflects off a rough surface, components of the light combine with other components to form patches of higher intensity light and lower intensity light. In a detector with a finite aperture, such as a human eye, these varied patches of intensity appear as speckles, as some small portions of the image look brighter than other small portions. Further, this spot-to-spot intensity difference can vary depending on observer's position, which makes the speckles appear to change when the observer moves.

Turning now to FIG. 1, illustrated therein is a prior art system 100 in which an observer 102 may perceive speckle. Specifically, a coherent light source 101, such as a semiconductor-type or standard laser, delivers a coherent beam 104 to a modulation device 103. The modulation device 103 modulates the coherent beam 104 into a modulated coherent beam 105 capable of forming an image. This modulated coherent beam 105 is then delivered to a projection medium, such as the projection screen 107 shown in FIG. 1.

As the projection screen 107 surface has a random roughness, i.e., as it includes tiny bumps and crevices that are randomly distributed, the reflected light 108 has portions that combine and portions that cancel. As a result, the observer 102 views an image 106 that appears to be speckled. The presence of speckle often tends to perceptibly degrade the quality of the image produced using the laser projection system.

Numerous attempts have been made to control speckle. Prior art speckle reduction systems employ diffusers, image displacing devices, and other complex systems. Some speckle reduction systems, such as those used with microscopes, employ long lengths of optical fiber in an attempt to induce mode mixing prior to delivering it to a user's eye. A drawback associated with each of these systems is that they add substantial cost and complexity to the overall system design. For instance, time-varying diffusers require moving or vibrating parts that adversely affect the overall system size and complexity. Further, such systems tend to increase the power requirements of the overall system, thereby degrading efficiency.

There is thus a need for an improved speckle-reducing system for use with laser-based projection systems such as those employing semiconductor-type lasers.

BRIEF DESCRIPTION OF THE DRAWINGS

FIG. 3 illustrates a plan view of one birefringent wedge suitable for use with embodiments of the invention.

FIG. 4 illustrates a side, elevation view of one birefringent wedge suitable for use with embodiments of the invention.

FIG. 5 illustrates one embodiment of a birefringent wedge suitable for use with embodiments of the invention.

FIG. 11 illustrates one embodiment of a birefringent wedge-glass wedge configuration in accordance with embodiments of the invention.

FIG. 12 illustrates one embodiment of a birefringent wedge-glass wedge configuration in accordance with embodiments of the invention.

DETAILED DESCRIPTION OF THE INVENTION

Figure 1:
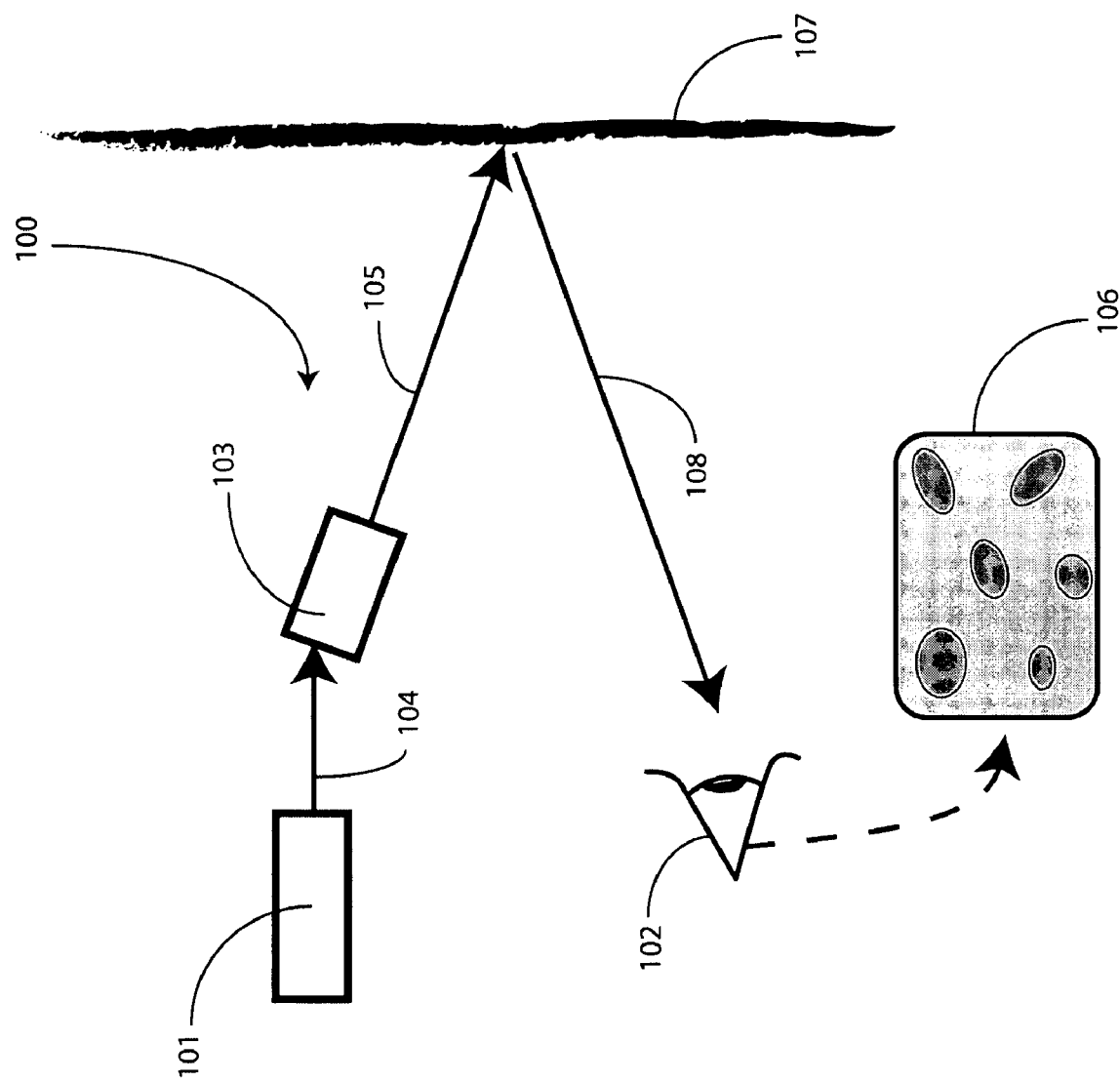
FIG. 1 illustrates a prior art laser-based projection system exhibiting speckle characteristics.

Before describing in detail embodiments that are in accordance with the present invention, it should be observed that the embodiments reside primarily in combinations of method steps and apparatus components related to an imaging system configured to reduce perceived speckle. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

It will be appreciated that embodiments of the invention described herein may be comprised of one or more conventional processors and unique stored program instructions that control the one or more processors to implement, in conjunction with certain non-processor circuits, some, most, or all of the functions of reducing speckle as described herein. The non-processor circuits may include, but are not limited to, microprocessors, scanning mirrors, image modulation devices, memory devices, clock circuits, power circuits, and so forth. As such, these functions may be interpreted as steps of a method to perform speckle reduction. Alternatively, some or all functions could be implemented by a state machine that has no stored program instructions, or in one or more application specific integrated circuits, in which each function or some combinations of certain of the functions are implemented as custom logic. Of course, a combination of the two approaches could be used. It is expected that one of ordinary skill, notwithstanding possibly significant effort and many design choices motivated by, for example, available time, current technology, and economic considerations, when guided by the concepts and principles disclosed herein will be readily capable of generating such programs and circuits with minimal experimentation.

Embodiments of the invention are now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on." Relational terms such as first and second, top and bottom, and the like may be used solely to distinguish one entity or action from another entity or action without necessarily requiring or implying any actual such relationship or order between such entities or actions. Also, reference designators shown herein in parenthesis indicate components shown in a figure other than the one in discussion. For example, talking about a device (10) while discussing figure A would refer to an element, 10, shown in figure other than figure A.

Embodiments of the present invention employ a birefringent wedge within a laser projection system to separate one or more laser beams into two angularly separated components that are substantially orthogonally polarized, thereby reducing perceived speckle. As is known in the art, two orthogonally polarized laser beams from the same laser source do not generally interfere with each other, even when reflected from a non-uniform surface. The birefringent wedge designs of embodiments of the present invention offer a passive, readily manufacturable, simple solution to reducing speckle caused by a single laser source or multiple laser sources.

A specially shaped birefringent "wedge" is used with embodiments of the invention. As used herein, a birefringent wedge refers to a birefringent crystal cut with non-parallel major faces. Embodiments of the invention take into consideration the fact that the angular separation introduced by birefringent materials, while mitigating speckle, also impacts resolution. Where the angular separation is too great, image resolution can be adversely affected. As such, various embodiments of the invention described below utilize birefringent wedges having optimized design specifications, tolerances, and specification measurement ranges. Some of these ranges are examples, and are directed to a particular application. However, even the exemplary specifications described herein are not mere "design choices," but rather are chosen to achieve a substantial reduction in speckle without adversely impacting image resolution in a particular application. For example, in one embodiment described below a birefringent wedge is designed to deliver an angular separation of between 1.5 and 2.0 arc minutes, such as approximately 1.8 arc minutes or 0.030 degrees. While the ranges can vary based upon the application, type of laser source employed, and overall physical dimensions of the laser projection source and projection surface, exemplary ranges suitable for mitigating speckle while preserving image resolution will be provided herein for compact laser projection sources, such as those employing Microelectromechanical System (MEMS) scanning mirrors as light modulation devices to form images. These exemplary ranges and specifications will guide the designer having the benefit of this disclosure in determining similar ranges for other applications.

Embodiments of the present invention offer many advantages over prior art speckle reduction techniques. To begin, embodiments of the invention employing the birefringent wedge are readily manufacturable. For example, in one embodiment a birefringent wedge made of crystal quartz (SiO.sub.2) having major face dimensions of approximately three millimeters by three millimeters, with a thickness of approximately one millimeter, is used with a MEMS laser projection system. The wedge angle of such a design is approximately four degrees. Such a birefringent wedge delivers sufficient angular separation to reduce speckle by as much as twenty-five percent without deleteriously affecting resolution of the resulting image. Further, using these exemplary dimensions, the thickness can vary by one-tenth of a millimeter in any direction, while the wedge angle can vary by a tenth of a degree in either direction without adversely affecting performance. The major face can vary by two tenths of a millimeter in any direction. These tolerances are easily manufactured with readily available birefringent materials, and such a birefringent wedge is easily integrated into a compact laser projection source. Orientation with an incident beam within a three-degree tolerance, in one particular application, of the optic axis of the wedge results in over a twenty percent reduction in overall speckle.

A second advantage of embodiments of the present invention is that birefringent wedges in accordance with the present invention do not adversely affect the large depth of focus offered by laser projection sources. By way of example, MEMS based laser projection systems, such as those manufactured by Microvision, Inc., have a depth of focus that is tens of meters long. By incorporating a birefringent wedge in accordance with embodiments of the invention, this depth of focus is not substantially affected.

Another advantage offered by embodiments of the present invention is that the overall brightness of the laser projection system is not adversely affected by the inclusion of a birefringent wedge with the use of optical coatings along major faces of birefringent wedge. For example, in one embodiment a single birefringent wedge is used to reduce speckle caused by a green laser source. In such an embodiment, overall brightness has been shown to be affected by no more than two percent. In another embodiment, two birefringent wedges are employed—one to mitigate speckle caused by red laser light and one to mitigate speckle caused by green laser light. In this embodiment, a polarization rotating device can optionally be used to further reduce speckle contrast ratio. In this embodiment, overall brightness of the laser projection system remains above ninety-five percent of its original brightness.

A third advantage is that the birefringent wedge is compact, simple, and does not introduce moving parts. Further, the birefringent wedge does not require additional energy. Birefringent wedges in accordance with embodiments of the present invention can be mounted on printed circuit boards— either by way of adhesives or by mechanical carriers—and can be used with semiconductor type laser sources. Further, as the birefringent wedge can be made in a small form factor, other components of the system do not need to be altered. For example, when using a birefringent wedge in a MEMS-scanner-based laser projection system, the dimensions of the scanner mirror do not need to be changed as the angular separation is small enough as to not alter the overall size of the beam being delivered to the mirror.

One other advantage of embodiments of the present invention is that a laser projection source employing a birefringent wedge as described herein can be used with other speckle mitigation techniques, such as, but not limited to, wavelength diversity or frame-to-frame averaging of uncorrelated speckle patterns techniques. For example, a laser projection system using a birefringent wedge in accordance with embodiments of the present invention can be used with modules configured to alter successive frames of the images created by the light modulator, such as polarization switching modules, transverse phase modulation modules, static pseudo random couple phase modulation devices, or laser sources that are driven by high speed modulation devices.

Figure 2:
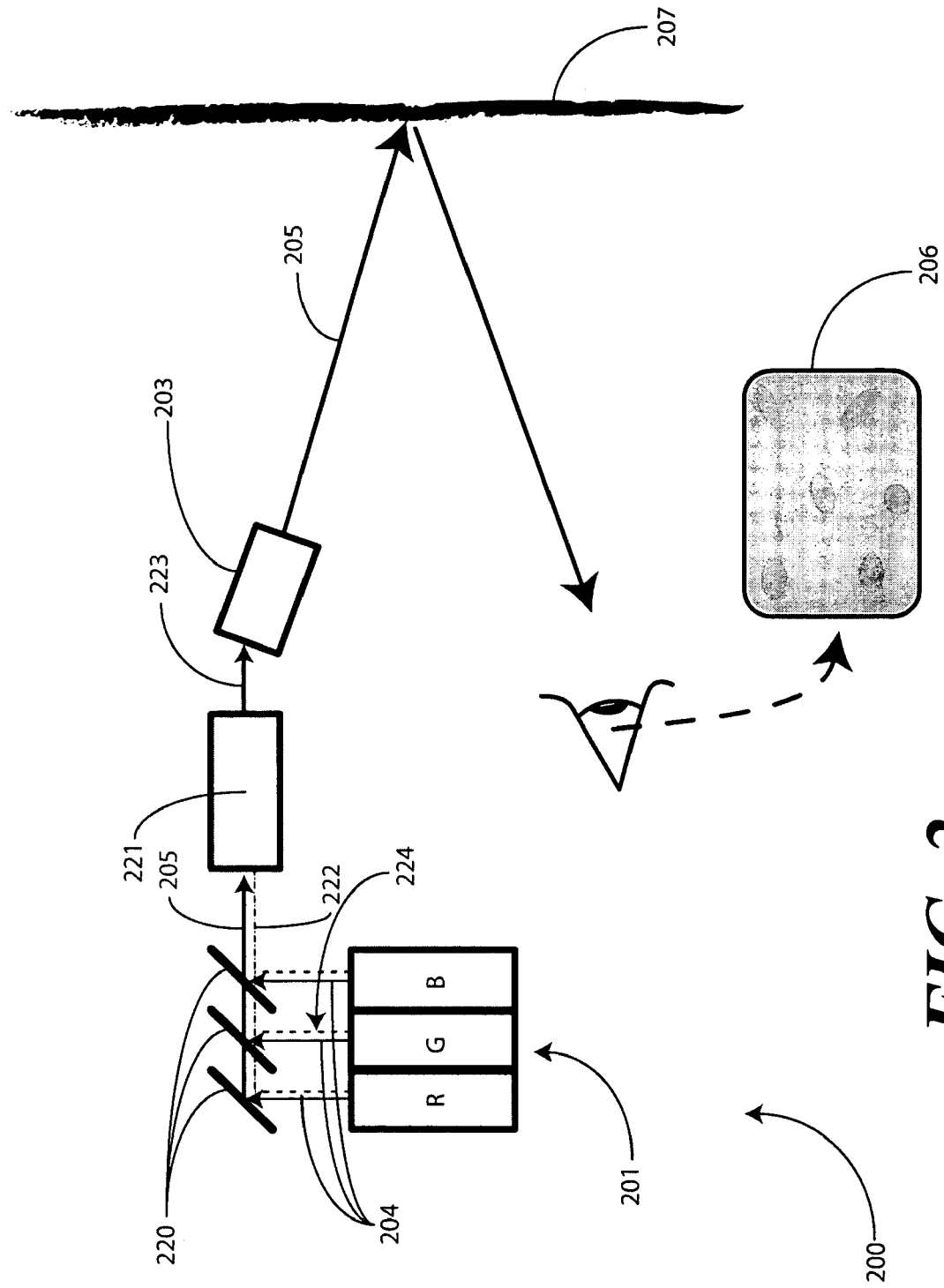
FIG. 2 illustrates one embodiment of a speckle reduction system in accordance with embodiments of the present invention.

Turning now to FIG. 2, illustrated therein is a general block diagram of a speckle-reducing laser imaging system 200 in accordance with embodiments of the invention. A one or more laser sources 201 is configured to produce a plurality of light beams 204. In one embodiment, the one or more laser sources 201 comprise a red laser, a blue laser, and a green laser, as indicated by the "R," "G," and "B" in the illustrative embodiment of FIG. 2. These lasers can be various types of lasers. In one embodiment, each laser is a semiconductor laser that is small and efficient. For example, in one embodiment, the one or more laser sources 201 comprise edge-emitting lasers. In another embodiment, the one or more lasers sources 201 comprise vertical cavity surface emitting lasers. Such semiconductor lasers are well known in the art and are commonly available from a variety of manufacturers.

To facilitate freedom of design, i.e., to permit the designer to orient the one or more laser sources 201 in different ways relative to the light modulator 203, one or more optical alignment devices 220 can be used to direct light beams 204 from the one or more laser sources 201. The one or more optical alignment devices 220, in one embodiment, are used to orient the plurality of light beams 204 into a single light beam 205. Where the one or more laser sources 201 comprise a red laser, blue laser, and green laser, the one or more optical alignment devices 220 can blend the output of each laser to form a coherent beam of white light. In accordance with one embodiment of the invention, this combined light beam 205 is circularly polarized. In accordance with another embodiment of the invention, the combined light beam 205 is linearly polarized at an angle of about forty-five degrees relative to an orientation of the optical axis of the birefringent wedge 221 for optimum energy repartition between the two beams, i.e., to balance the relative intensity of each beam. The term "about" is used to indicate that the forty-five degree polarization can be slightly more or less due to manufacturing tolerances.

In one embodiment, dichroic mirrors are used as the one or more optical alignment devices 220. The dichroic mirrors are used to orient the plurality of light beams 204 into the combined light beam 205. Dichroic mirrors are partially reflective mirrors that include dichroic filters that selectively pass light in a narrow wavelength bandwidth while reflecting others. In one embodiment, polarizing coatings can be incorporated into the dichroic mirrors where the combined light beam 205 is linear polarized. Dichroic mirrors and their use in laser-based projection systems are known in the art and, as such, will not be discussed in further detail here.

Note that the location, as well as the number, of the optical alignment devices 220 can vary based upon application. For example, in some MEMS-type scanning systems, the plurality of light beams 204 can be modulated directly into the scanning mirror. This "light modulator" can then feed into an optical alignment device. Alternatively, some applications may not require optical alignment devices 220.

A light modulator 203 is then configured to produce images 206 by modulating the combined light beam and delivering it to a display surface 207. In one embodiment, the light modulator 203 comprises a MEMS scanning mirror. Examples of MEMS scanning mirrors, such as those suitable for use with embodiments of the present invention, are set forth in commonly assigned, copending U.S. patent application Ser. No. 11/786,423, filed Apr. 10, 2007, entitled, "Integrated Photonics Module and Devices Using Integrated Photonics Module," which is incorporated herein by reference, and in U.S. Pub. patent application Ser. No. 10/984,327, filed Nov. 9, 2004, entitled "MEMS Device Having Simplified Drive," which is incorporated herein by reference.

Embodiments of the invention are well suited for use with MEMS scanning mirrors as the birefringent wedges used with embodiments of the invention can be manufactured with a compact form factor. As a result, the overall system can be designed with a very small form factor, suitable for use in portable electronics such as mobile telephones, personal digital assistants, gaming devices, music players, multimedia devices, wearable optics with head-up displays, and so forth.

To reduce perceived speckle, in one embodiment a birefringent wedge 221 is disposed between the one or more light sources 201 and the light modulator 203. In the illustrative embodiment of FIG. 2, the birefringent wedge 221 is disposed between the one or more optical alignment devices 220 and the light modulator 203. It will be clear to those of ordinary skill in the art having the benefit of this disclosure, however, that the invention is not so limited. For example, a birefringent wedge could be disposed between each laser source 201 and its respective optical alignment device 220. For instance, a birefringent wedge used to mitigate speckle caused by the green laser source may be placed at location 224.

It is known to those in the art that birefringent materials operate on different frequencies in different ways. For example, angular separation introduced into a green laser beam will be different from the angular separation introduced into a blue laser beam. Accordingly, embodiments of the present invention have been optimized or tuned to mitigate speckle caused by certain wavelengths of light. For example, experimental testing has shown that green light, with a wavelength of about 532 nanometers, is responsible for a large percentage of perceived speckle in a laser system employing red, green, and blue lasers. The red laser contributes the next largest percentage of speckle, followed by blue. Blue light is less perceptible by the human eye, so the speckle caused by blue light is relatively small.

In the illustrative embodiment of FIG. 2, the birefringent wedge 221 is disposed such that the combined light beam 205 intersects the birefringent wedge 221. However, as green light contributes substantially to speckle, the birefringent wedge 221 of FIG. 2 is optimized for speckle reduction for the green wavelength. As such, the birefringent wedge 221 is tuned such that the desired angular separation of about 1.8 arc minutes occurs at the green wavelength. With such a design, the birefringent wedge 221 can be disposed as shown in FIG. 2, i.e., between the one or more optical alignment devices 220 and the light modulator 203 along an optical axis 222 of the system 200. Alternatively, it could be disposed at location 224, which is between the green laser source and its respective optical alignment device. Such an embodiment is shown in FIG. 14.

Figure 14:
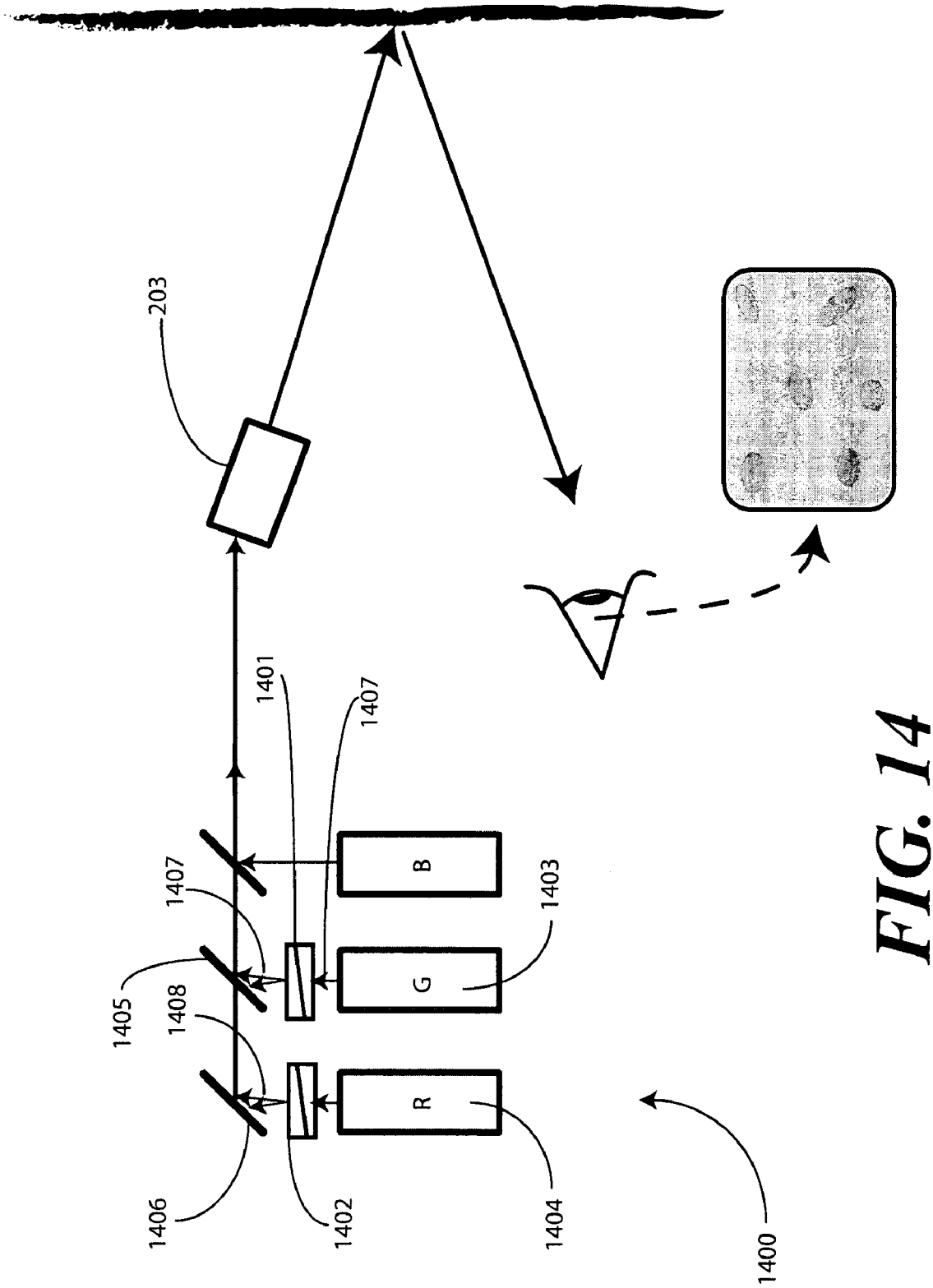
FIG. 14 illustrates another embodiment of a speckle reduction system in accordance with embodiments of the present invention Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

Turning briefly to FIG. 14, illustrated therein is an imaging system 1400 employing multiple birefringent wedges 1401, 1402. As with the system (200) of FIG. 2, optical alignment devices 1405, 1406 are used to orient light from the laser sources 1403,1404 to the light modulator 203. Specifically, a first optical alignment device 1405 is disposed between the green laser source 1403 and the light modulator 203 along an optical axis 1407. A second optical alignment device 1406 is disposed between the red laser source 1404 and the light modulator 203 along a second optical axis 1408.

In this illustrative embodiment, one birefringent wedge 1401 is being used to create angular separation for the green laser source 1403, while a second birefringent wedge 1402 is being used to create angular separation for the red laser source 1404. In this embodiment, the first birefringent wedge 1401 is disposed between the green laser source 1403 and its corresponding optical alignment device 1405, and the second birefringent wedge 1402 is disposed between the red laser source 1404 and the second optical alignment device 1406.

In this configuration, the first birefringent wedge 1401 can be tuned to optimize the angular separation of the green wavelength, while the second birefringent wedge 1402 can be optimized for the desired angular separation of the red wavelength. A third birefringent wedge can be used with the blue laser source.

Turning now back to FIG. 2, regardless of its placement, the birefringent wedge 221 is configured, in one embodiment, to receive the combined light beam 205 and deliver two angularly separated light beams 223 to the light modulator 203 so as to reduce perceived speckle appearing when images 206 are displayed on a display surface 207. Further, as a birefringent material is being used to introduce the separation, the resulting angularly separated light beams 223 will be substantially orthogonally polarized as well.

Note that in an alternative embodiment, the birefringent wedge 221 can be placed after the light modulator 203. Said differently, the birefringent wedge 221 can be disposed between the light modulator 203 and the display surface 207 so as to reduce perceived speckle. Where a MEMS-based scanning system is used as the light modulator 203, the birefringent wedge will generally be placed between the laser sources and the light modulator 203. However, when other projection sources are employed, such as a digital light projection system or liquid crystal on silicon system, the birefringent wedge 221 might be disposed between the light modulator 203 and the display surface 207.

While the dimensions and specifications of the birefringent wedge 221 are somewhat changeable based upon application, for illustrative purposes, one embodiment of a birefringent wedge 221 suitable for use with MEMS scanning laser light projection systems will be described herein. It will be clear to those of ordinary skill in the art having the benefit of this disclosure that the invention is not so limited, however. For example, while the specifications and tolerances described herein are suitable for use with some embodiments of MEMS-based laser projection systems, the description herein will guide those of ordinary skill in the art having the benefit of this disclosure to obtain birefringent wedges having different dimensions and tolerances as determined by a particular application or requirements.

In the illustrative embodiment that will be described herein, the birefringent wedge 221 is designed and tuned to introduce an angular separation of between 1.5 and 2.0 arc minutes for the green wavelength of light. In one exemplary embodiment, the birefringent wedge 221 is designed such that the angular separation for the green wavelength is about 1.8 arc minutes, or 0.030 degrees. Consequently, the two angularly separated light beams 223, where those angularly separated light beams 223 comprise light of the green wavelength, will be separated by an angle of about 1.8 arc minutes. This angle, in the configuration of FIG. 2, has been shown to reduce speckle by twenty percent without significantly affecting depth of focus or image resolution.

This particular angular separation is useful in laser projection systems, such as MEMS scanned laser projection systems, for several reasons. First, it conserves the very long depth of focus associated with these systems in that the angle is small enough that no additional optically transformative components need to be added to the system to compensate for this angular separation. Said differently, when introducing a small angular separation such as less than two arc minutes, from the perspective of the image projection system it merely creates images with a slightly wider beam. No projection-type optic components are required for the system to operate normally.

Another advantage to this amount of angular separation is that it enables a laser projection system to be designed with a very compact form factor. For example, in a MEMS scanned laser projection system, the birefringent wedge 221 does not significantly alter the beam width on the scanning mirror. As such, there is no need to increase the size or geometry of the constituent parts of the image projection system.

Another advantage to this amount of angular separation is that it helps to mitigate raster modulation where the separation occurs along the slow scanning axis of the raster scanning system. This is due to the fact that the angular separation creates a slightly larger beam along the slow scanning axis of the raster system, thereby mitigating raster modulation.

One other advantage to this amount of angular separation is that it minimally impacts brightness of the overall system. For example, where one birefringent wedge 221 delivering an angular separation of between 1.5 and 2.0 arc minutes is used, as shown in FIG. 2, the reduction in overall brightness of images projected on a surface will be less than a two percent reduction.

Turning now to FIGS. 3-5, illustrated therein is one embodiment of a birefringent wedge 221 suitable for use with laser projection sources in accordance with embodiments of the invention. In one embodiment, the birefringent wedge 221 is made of crystal quartz and includes a first major face 301 and a second major face 401. The second major face 401 is disposed opposite the birefringent wedge 221 relative to the first major face 301. FIG. 3 illustrates a plan view of the birefringent wedge 221, showing a major face 301, while FIG. 4 illustrates a side, elevation view of the birefringent wedge 221, where the first major face 301, second major face 401, and thickness 402 can be seen. FIG. 5 illustrates angularly separated beams 501 exiting the birefringent wedge 221. The illustrative birefringent wedge 221 shown in FIGS. 3-5 is suitable, as noted above, for use in MEMS scanned laser projection sources.

As the birefringent wedge 221 is indeed a wedge, the first major face 301 and second major face 401 are non-parallel with respect to each other. As viewed in FIG. 4, the top 403 of the birefringent wedge 221 is thicker than the bottom 404 of the birefringent wedge 221. As such, the first major face 301 and second major face 401 are configured at a wedge angle 405. In one embodiment, the wedge angle 405 is between 3.6 degrees and 4.4 degrees. For example, in manufacture, the birefringent wedge 221 can be designed such that the wedge angle 405 is 4.0 degrees, plus or minus 0.4 degrees. This wedge angle 405, in conjunction with the specified birefringent material optical axis angle 417, is well suited to deliver the 1.8 arc minute angle for a MEMS scanned laser source mentioned above.

When selecting the wedge angle 405, it is well to note that a larger wedge angle 405 increases the acceptable tolerance in manufacture for the wedge angle 405. Said differently, the larger the wedge angle 405 is, the looser the tolerance specifications for that wedge angle 405 can be. However, a larger wedge angle increases sensitivity of angular separation to physical alignment of the birefringent wedge 221 within the system. In other words, a larger wedge angle 405 increases the sensitivity of alignment of the optical axis 406 with respect to the wave vector impinging upon the birefringent wedge 221. For this reason, in one embodiment, the wedge angle 405 is kept small, such as on the order of three to five degrees, to make the image projection system more easily manufactured.

The next design consideration is the angle of the optical axis 406 relative to the light 407 incident upon the birefringent wedge 221. In one embodiment, the birefringent wedge 221 is manufactured so that for a transmission angle normal to the surface of first major face 301, the angle between the optical axis 406 and the ray will be comprised between 61.5 degrees and 67.5 degrees. This exemplary optical axis angle 417 is suited to deliver the 1.8 arc minutes angle for a MEMS scanned laser source, where the wedge angle 405 is about 4 degrees, in the above mentioned configuration. To maintain a ten percent tolerance on angular separation, the birefringent wedge 221 64.5 degrees, plus or minus three degrees. Thus, a six-degree tolerance is permitted during manufacture within which to reduce speckle without substantially affecting resolution.

In yet another embodiment of the invention, it is possible to modify the angular separation of the two beams by "clocking" the birefringent wedge clockwise or counterclockwise with respect to the input beam. Rotating the wedge by about twenty degrees, both clockwise and counterclockwise, results in an angular separation ranging from 1.3 arc minutes to 2.5 arc minutes, which is within the design parameters described previously.

Another design consideration is the polarization of incident light 407. As noted above, in one embodiment, the incident light 407, which is generated by a laser source in a laser projection system, is circularly polarized light 302. As is known in the art, circularly polarized light 302 is split into two orthogonally polarized, angularly separated components by a birefringent wedge 221. In one embodiment, to optimize speckle reduction, one should ensure that each of the two angularly spaced components have the same intensity. This can occur when the incident light 407 is circularly polarized light 302.

This can also occur when the incident light 407 is linearly polarized light 303, provided it is properly polarized. As is known in the art, when incident light 407 having an arbitrary polarization enters a birefringent material, it splits into two component beams. A birefringent material is characterized by its indicatrix which is an ellipsoid. One component beam is polarized along the long axis of the elliptical cross section of the indicatrix with a plane normal to the wave vector. The other component beam is polarized along the short axis of the elliptical cross section of the indicatrix with a plane normal to the wave vector. In a uniaxial birefringent material the indicatrix is a spheroid with the optical axis being the axis of rotation. In this case either the minor or major axis of the elliptical cross section has the same length for all directions of the wave vector. The component polarized along this direction is called the ordinary wave. The component polarized along the other axis is called the extraordinary wave. These components travel independently in separate directions and at different velocities.

When incident light 407 is polarized, it moves in accordance with the indices of refraction of the birefringent wedge 221 and in accordance with its polarization. For example, waves polarized in the equatorial plane of the indicatrix move at a velocity related to a first index of refraction, and which is expressed as $c/n_o$. This ordinary index of refraction is a function of optical axis 406 orientation 304. Waves polarized perpendicularly to the ordinary polarization move at a velocity related to a second index of refraction, which is expressed as $c/n_e$. This is the extraordinary index of refraction Where the incident light 407 is polarized, optimum energy repartition occurs when the polarization is about 45 degrees relative to the orientation 304 of the optical axis 406. As such, in one embodiment, the incident light 407 is linearly polarized light. Specifically, the incident light 407 includes linearly polarized light 303 that is polarized at an angle of about 45 degrees relative to the orientation 304 of the birefringent wedge optical axis 406 along the first major face 301 of the birefringent wedge 221.

The dimensions of the major faces 301,401 can vary. In one embodiment, suitable for use with MEMS scanning laser sources, the first major face 301 and second major face 401 each measure between 2.0 and 5.0 millimeters in length and width. For example, in one embodiment the birefringent wedge 221 is effectively square along its first major face 301, as the length and width measure 3.0 millimeters, with a tolerance of plus or minus 0.2 millimeters.

Regarding thickness, in one embodiment, the thickness 402 of the birefringent wedge 221 is between 0.75 millimeters and 1.25 millimeters. For example, in one embodiment suitable for use with a MEMS scanning laser projector, the thickness 402 of the birefringent wedge 221 is 1.0 millimeters with a manufacturing tolerance of plus or minus 0.1 millimeters.

In one embodiment, to aid in manufacture, an alignment notch 305 can be included in the birefringent wedge 221. The alignment notch 305 assists a technician assembling a laser projection system in accordance with embodiments of the invention to identify the orientation 304 of the optical axis 406 of the birefringent wedge 221 without the use of optical instruments or test fixtures. The inclusion of the alignment notch 305 is optional, but may save time during manufacture and testing.

In one embodiment, the birefringent wedge 221 is manufactured from crystalline quartz ($SiO_2$). Crystalline quartz is well suited to embodiments of the invention in that it is relatively inexpensive, has indices of refraction that can be tailored to the green wavelength, and is readily manufacturable within the tolerances set forth in the illustrative embodiments above. Additionally, the birefringent magnitude, which is the difference of $n_o$ from $n_e$, is easily configured to deliver an angle of separation that reduces speckle without significantly affecting overall resolution. Specifically, in one embodiment the crystalline quartz is a uniaxial, anisotropic crystal for which the refractive index will be dependent upon the input beam polarization, and the angular separation will be directly proportional to the birefringent magnitude and the wedge angle 405.

While crystalline quartz is one material suitable for manufacture of the birefringent wedge 221, it will be clear to those of ordinary skill in the art having the benefit of this disclosure that the invention is not so limited. For example, in one embodiment polymerized liquid crystal can be used to manufacture the birefringent wedge 221. When using polymerized liquid crystal, a particular orientation 304 of the optical axis 406 can be configured electronically in the polymerized liquid crystal. This orientation 304 can then be "set" in place. In so doing, the polymerized liquid crystal can be designed specifically for a particular application or design.

It has been noted above that the angular separation introduced by the birefringent wedge 221, and the resulting speckle reduction, inversely affects resolution. In one illustrative design created in accordance with embodiments of the invention, the angular separation desired for the green wavelength is about 1.8 arc minutes. However, for design purposes, there will be some tolerances in the various design specifications that are achieved. To assist the designer in understanding the affects of manufacturing tolerances associated with developing birefringent wedges 221 in accordance with embodiments of the invention, FIGS. 6-9 illustrate how a tolerance of plus or minus ten percent affects beam growth, speckle reduction, raster modulation, and line on-line off contrast, respectively, where a birefringent wedge 221 in accordance with the illustrative embodiment is used.

Figure 6:
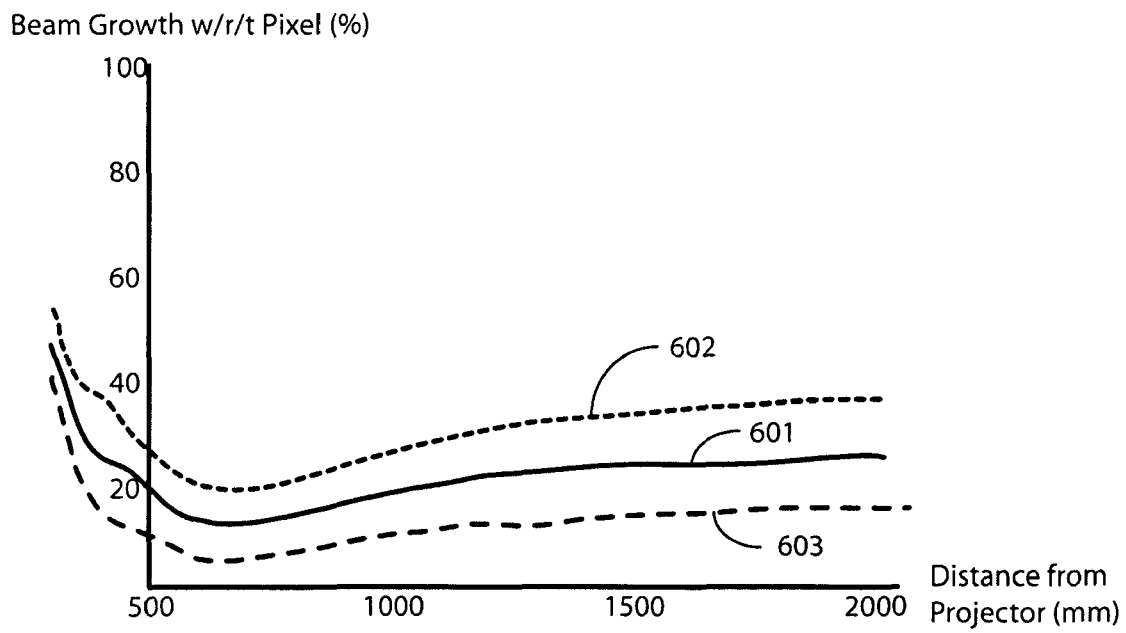
FIG. 6 illustrates a plot of simulated beam growth versus distance from a laser projection source, where that laser projection source employs one embodiment of a birefringent wedge in accordance with embodiments of the invention.

Turning first to FIG. 6, illustrated therein is a plot of beam growth, with respect to pixel size, expressed as a percentage, versus distance from a laser projection system employing a birefringent wedge (221) in accordance with one embodiment of the invention. Plot 601 illustrates a nominal beam growth when employing an angular separation of 1.8 arc radians as created by the birefringent wedge (221). Plot 602 illustrates beam growth when the tolerances associated with the birefringent wedge (221) are increased by ten percent. Plot 603 illustrates beam growth when the tolerances associated with the birefringent wedge (221) are decreased by ten percent.

Figure 7:
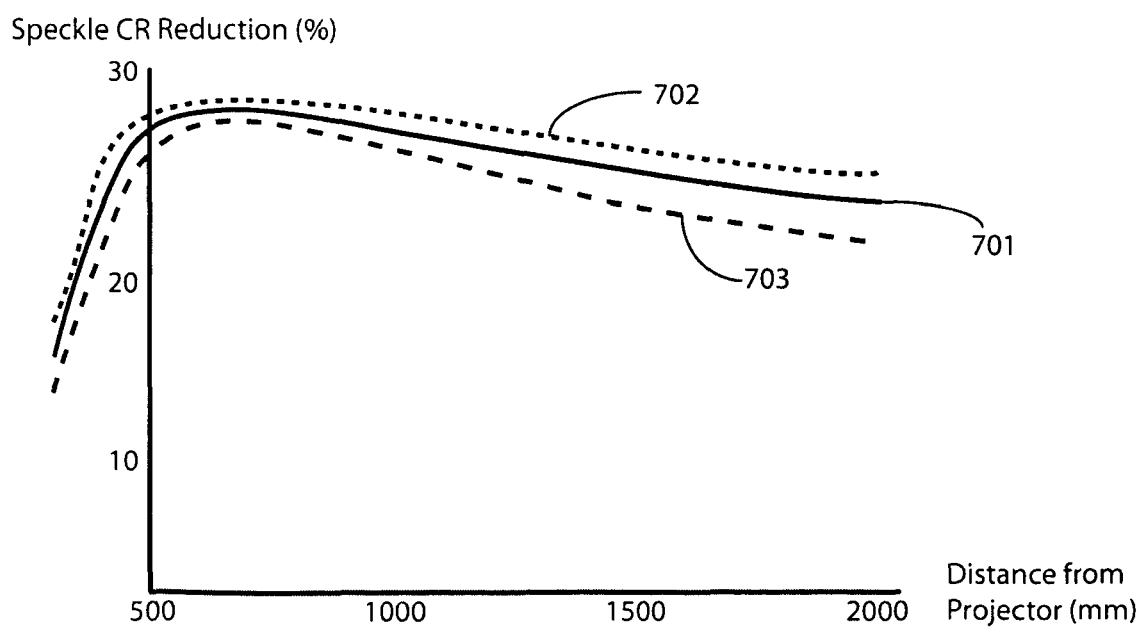
FIG. 7 illustrates a plot of simulated speckle reduction from a laser projection source, where that laser projection source employs one embodiment of a birefringent wedge in accordance with embodiments of the invention.

Turning now to FIG. 7, illustrated therein is a plot of speckle reduction, expressed as a percentage, versus distance from a laser projection system employing a birefringent wedge (221) in accordance with one embodiment of the invention. Plot 701 illustrates a nominal speckle reduction when employing an angular separation of 1.8 arc radians as created by the birefringent wedge (221). Plot 702 illustrates speckle reduction when the tolerances associated with the birefringent wedge (221) are increased by ten percent. Plot 703 illustrates speckle reduction when the tolerances associated with the birefringent wedge (221) are decreased by ten percent.

Figure 8:
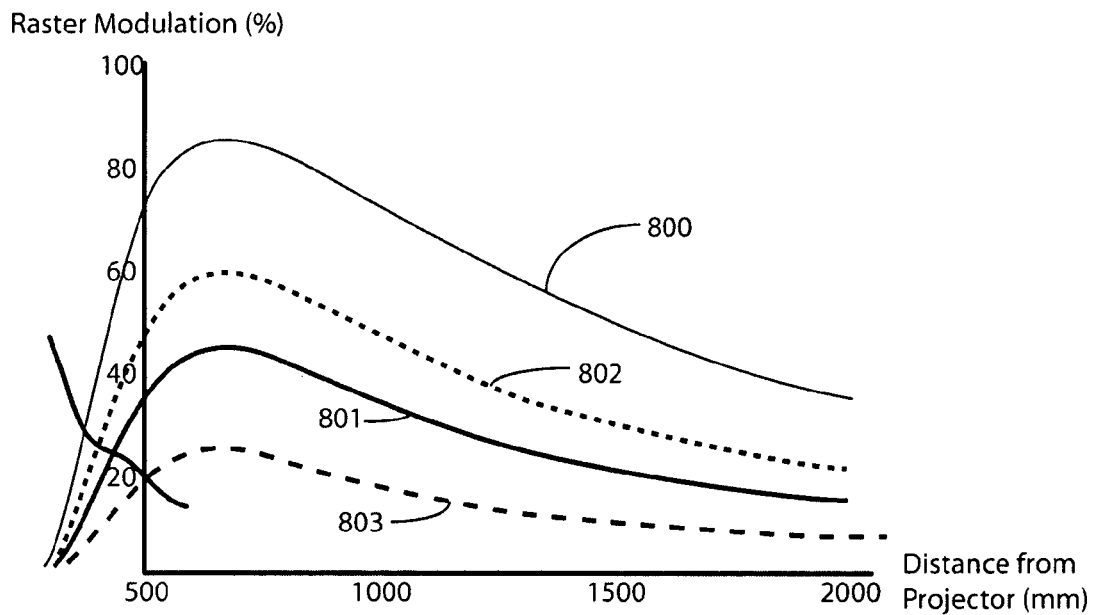
FIG. 8 illustrates a simulated raster modulation improvement from a laser projection source, where that laser projection source employs one embodiment of a birefringent wedge in accordance with embodiments of the invention.

Turning now to FIG. 8, illustrated therein is a plot of raster modulation, expressed as a percentage, versus distance from a laser projection system employing a birefringent wedge (221) in accordance with one embodiment of the invention. Plot 800 illustrates the raster modulation in a prior art laser imaging system that employs no birefringent wedge (221). Plot 801 illustrates a nominal raster modulation when employing an angular separation of 1.8 arc radians as created by the birefringent wedge (221). Plot 802 illustrates raster modulation when the tolerances associated with the birefringent wedge (221) are increased by ten percent. Plot 803 illustrates raster modulation when the tolerances associated with the birefringent wedge (221) are decreased by ten percent.

Figure 9:
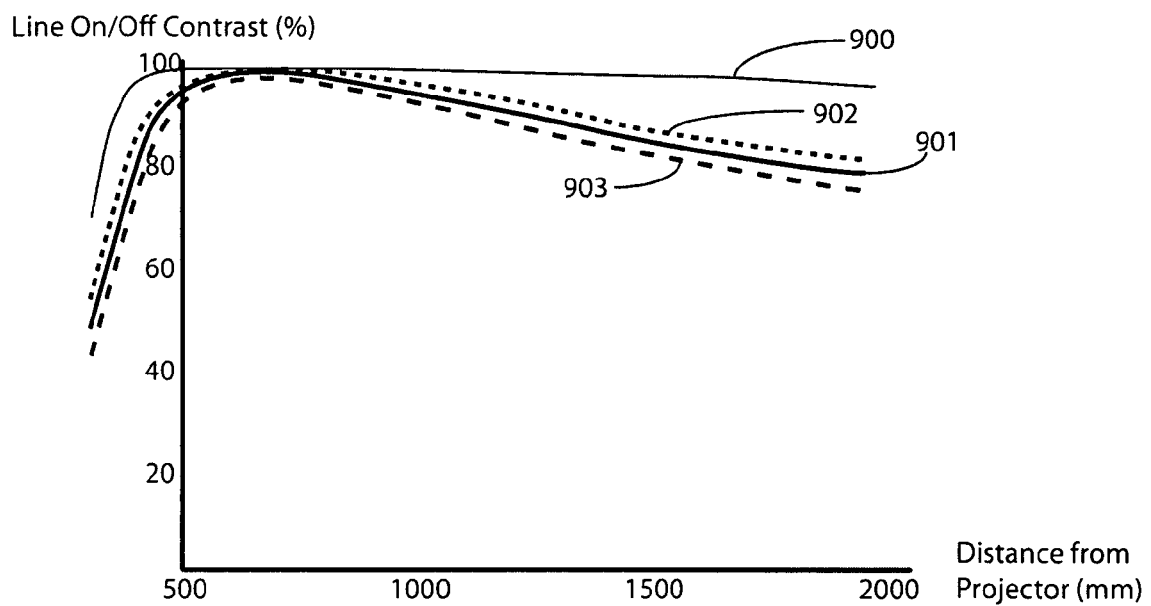
FIG. 9 illustrates a line on-line off contrast impact of a laser projection source, where that laser projection source employs one embodiment of a birefringent wedge in accordance with embodiments of the invention.

Turning now to FIG. 9, illustrated therein is a plot of line on-line off contrast, expressed as a percentage, versus distance from a laser projection system employing a birefringent wedge (221) in accordance with one embodiment of the invention. Plot 900 illustrates the line on-line off contrast in a prior art laser imaging system that employs no birefringent wedge (221). Plot 901 illustrates a nominal line on-line off contrast when employing an angular separation of 1.8 arc radians as created by the birefringent wedge (221). Plot 902 illustrates line on-line off contrast when the tolerances associated with the birefringent wedge (221) are increased by ten percent. Plot 903 illustrates on-line off contrast when the tolerances associated with the birefringent wedge (221) are decreased by ten percent.

Figure 10:
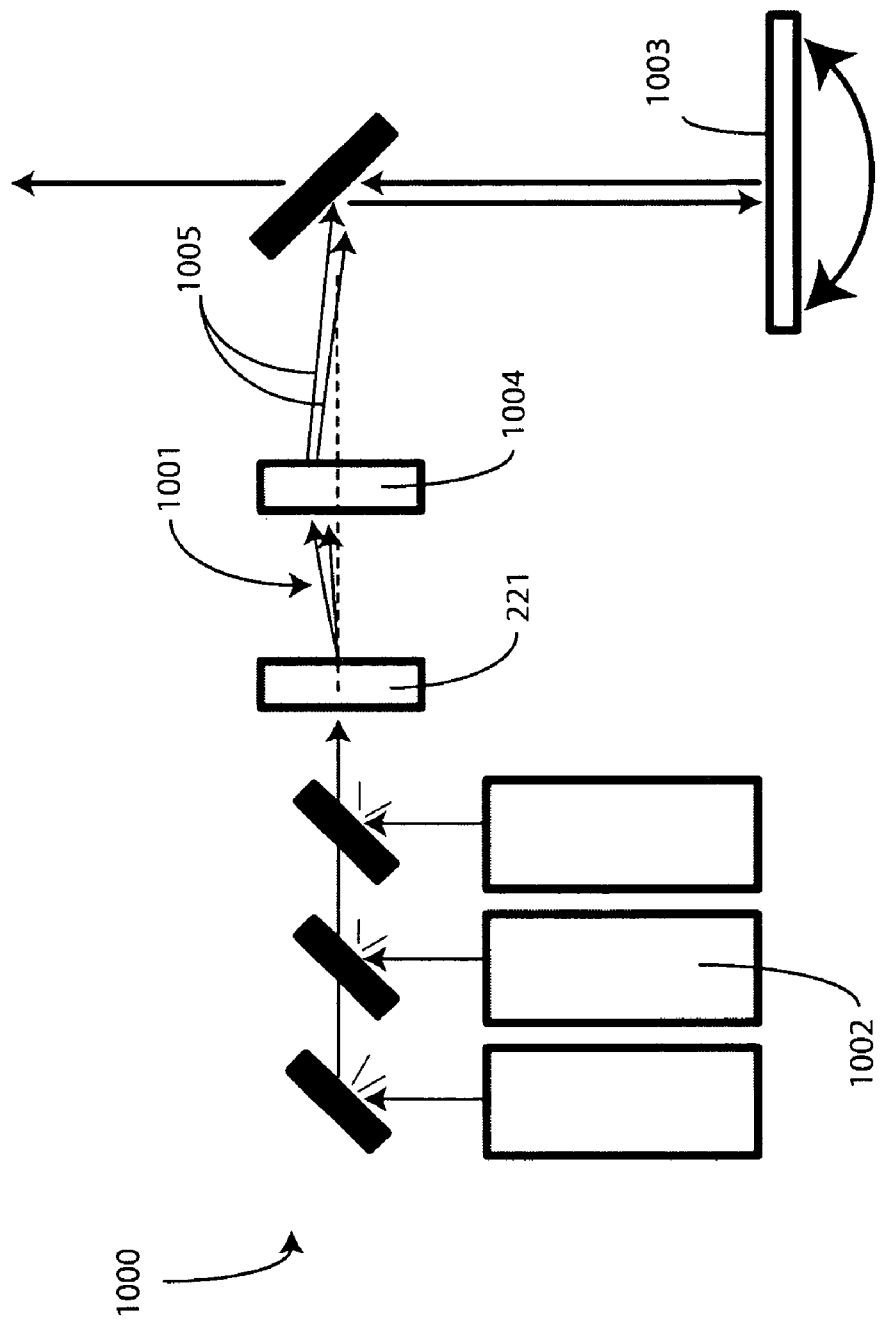
FIG. 10 illustrates one embodiment of a speckle reduction system in accordance with embodiments of the present invention that utilizes a corrective wedge.

Turning now to FIG. 10, illustrated therein is an alternate embodiment of a laser projection system 1000 in accordance with embodiments of the invention. When employing a birefringent wedge 221, optical path deviation 1001 will be introduced due to the refraction of the birefringent wedge 221. A designer, in one embodiment, can correct for this optical path deviation 1001 by physically reorienting the laser source 1002, the light modulator 1003, and where employed, optical alignment devices.

In another embodiment, rather than having to reconfigure the physical layout of the various components, a designer may employ an optical redirection component, such as a glass wedge 1004, to correct optical path deviation 1001 introduced by the birefringent wedge 221. In one embodiment, the glass wedge 1004 is manufactured from a material such as borosilicate crown glass, and is used to redirect the angularly separated beams 1005 leaving the birefringent wedge 221 back to the light modulator 1003. The glass wedge 1004 can also help to prevent clipping artifacts in the resulting image. In one embodiment, the glass wedge 1004 is disposed between the birefringent wedge 221 and the light modulator 1003. In another embodiment, where optical alignment devices are used, and where the birefringent wedge is disposed between an optical alignment device and a laser source, the glass wedge 1004 can be disposed between the birefringent wedge and the optical alignment device. In yet another embodiment, the glass wedge can be positioned between the birefringent wedge and the laser source.

As with the birefringent wedge 221, the glass wedge can be designed, tailored, and/or tuned to optimize the correction of optical path deviation 1001 for a particular application, light wavelength, or birefringent wedge design. Further, while a material like crown glass may be used, other materials may also be selected for use in the glass wedge 1004.

In addition to selecting the material and shape of the glass wedge 1004, the physical relationship of the glass wedge 1004 relative to the birefringent wedge 221 can also be optimized according to dispersion caused by the birefringent wedge 221 to correct for some chromatic differential steering effects. Turning now to FIGS. 11 and 12, illustrated therein are two possible physical relationships between the glass wedge 1004 and the birefringent wedge 221 in accordance with embodiments of the invention.

As shown in FIG. 11, in one embodiment the birefringent wedge 221 and glass wedge 1004 are disposed such that they are separated by an air gap 1101. In separating the birefringent wedge 221 and glass wedge 1004 by an air gap, each component can be manufactured as an individual part. For example, the birefringent wedge 221 can be ordered from a first supplier, while the glass wedge 1004 can be ordered from a second supplier, and so forth.

When separating the birefringent wedge 221 from the glass wedge 1004 with an air gap, it may be necessary to apply coatings to one or both components. For example, in one embodiment the glass wedge 1004 is coated with an antireflective coating 1102. Other coatings may be applied as required by a particular application.

In the embodiment of FIG. 11, four major faces must be aligned. The major faces of the birefringent wedge 221 must be properly aligned by the manufacturer. Similarly, the major faces of the glass wedge 1004 must be properly aligned by its manufacturer. Further, each of the birefringent wedge 221 and glass wedge 1004 must be aligned within a laser projection system. Turning now to FIG. 12, illustrated therein is another configuration of the birefringent wedge 221 and glass wedge 1004 in accordance with the invention that reduces some of the alignment and coating requirements.

In FIG. 12, the birefringent wedge 221 and glass wedge 1004 are physically coupled together. The birefringent wedge 221 and glass wedge 1004 may be coupled together, for example, by an optically non-interfering adhesive. Alternatively, the birefringent wedge 221 and glass wedge 1004 may be coupled together by an optical bonding process. The embodiment of FIG. 12, while slightly more complicated in initial manufacture, relieves the laser imaging system manufacturer of some of the alignment constraints associated with the embodiment of FIG. 11.

As mentioned above, embodiments of the invention employing birefringent wedges to reduce speckle are suitable for use with other speckle reduction techniques. As described above, by using a single birefringent wedge optimized for the green wavelength in a laser projection system employing red, green, and blue lasers, a speckle reduction of over twenty percent can be achieved. However, with the application of other speckle reduction techniques, the effective speckle reduction can approach fifty percent or better.

Figure 13:
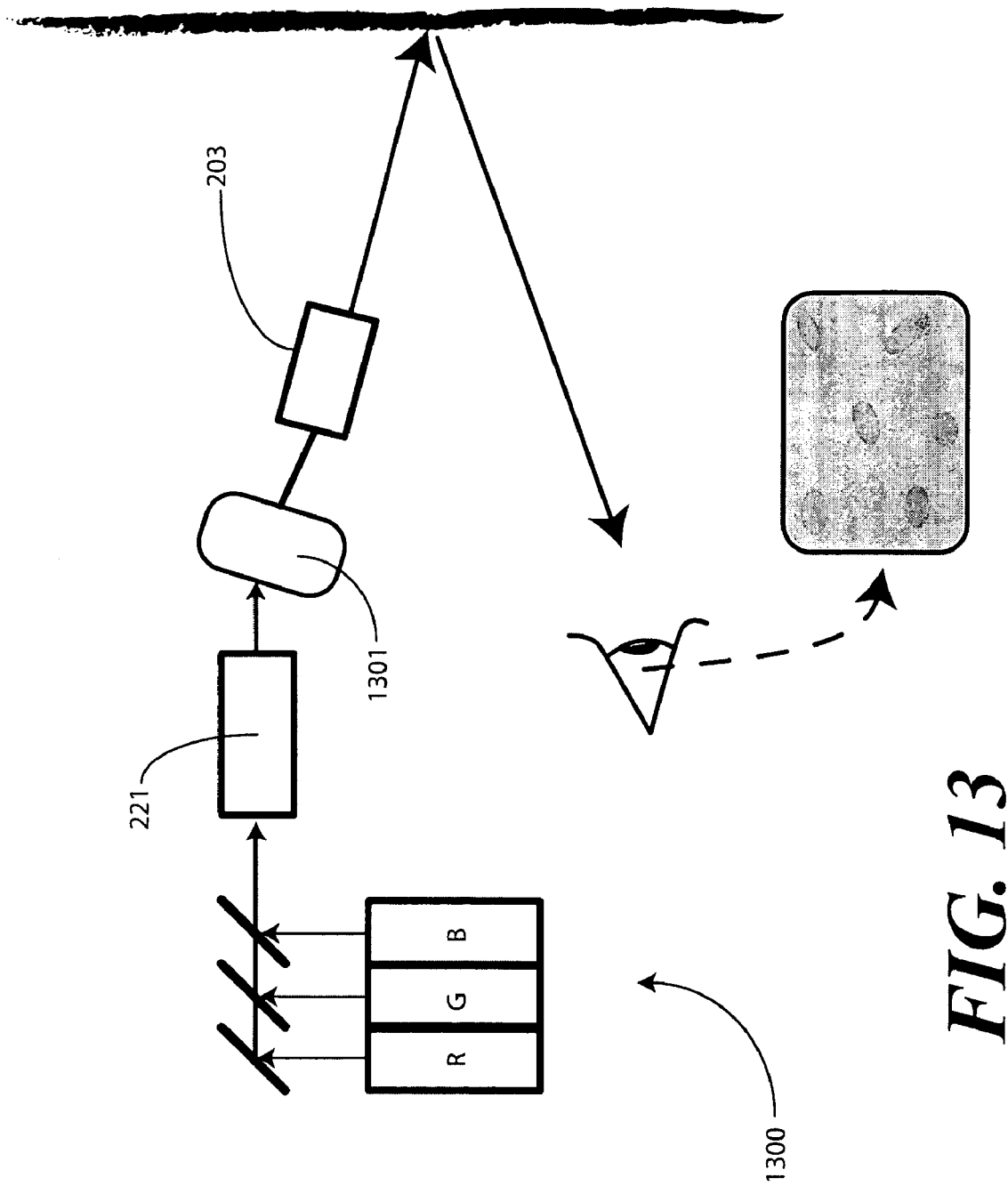
FIG. 13 illustrates another embodiment of a speckle reduction system in accordance with embodiments of the present invention.

Turning now to FIG. 13, illustrated therein is one embodiment of a laser projection system 1300 employing a second speckle reduction device 1301 in conjunction with a birefringent wedge 221 to further reduce speckle. In one embodiment, the second speckle reduction device 1301 is a temporal image-averaging device configured to generate uncorrelated speckle patterns at the screen for each consecutive frame.

The second speckle reduction device 1301 can take many forms. For example, in one embodiment it can be a rotating diffuser that temporally averages successive images created by the light modulator 203. While represented in FIG. 13 as a device occurring after the birefringent wedge 221, it will be clear to those of ordinary skill in the art having the benefit of this disclosure that other devices may also be used. For example, a laser projection system using a birefringent wedge 221 in accordance with embodiments of the present invention can be used with other modules or devices configured to alter successive frames of the images created by the light modulator 203, such as polarization switching modules, transverse phase modulation modules, static pseudo random couple phase modulation devices, or laser sources that are driven by high speed modulation devices.

As has been shown and described herein, embodiments of the invention provide a light projection source that includes a laser light source and a light modulator configured to produce images from light received from the laser light source. A birefringent crystal, configured as a wedge, is disposed along an optical axis occurring between the laser light source and the light modulator. The birefringent crystal receives light from the laser light source and delivers two angularly spaced beams to the light modulator. As the wedge is birefringent, the wedge causes the two angularly spaced beams to be substantially orthogonal in polarization.

In one illustrative embodiment, suitable for use with MEMS scanned laser projection systems, the birefringent wedge is designed such that the two angularly spaced beams are spaced at a separation angle of between 1.5 and 2.0 arc minutes. Such a design provides a passive optical system capable of achieving at least a twenty percent reduction in speckle with very limited impact to image quality, and without losing any of the advantages MEMS laser projection technology. These advantages include a very long depth of focus, small form factor, and brightness on the order of ten lumens emitted. Further, this design is readily manufacturable at a reasonable cost.

In one embodiment, the birefringent wedge is configured with a first major face being oriented at an angle of between 3.9 and 4.1 degrees relative to a second major face. In one embodiment, the birefringent wedge is disposed within a laser projection system such that received light impinges the birefringent wedge at an incident angle of between 61.5 and 67.5 degrees relative to a birefringent crystal optical axis.

In some embodiments, optical alignment devices are used to direct light from laser projection sources to a light modulator. In one embodiment, the birefringent wedge is disposed between the optical alignment device and the light modulator. To correct for optical deviation, an optional a glass wedge may then be disposed between the birefringent crystal and the light modulator.

In the foregoing specification, specific embodiments of the present invention have been described. However, one of ordinary skill in the art appreciates that various modifications and changes can be made without departing from the scope of the present invention as set forth in the claims below. Thus, while preferred embodiments of the invention have been illustrated and described, it is clear that the invention is not so limited. Numerous modifications, changes, variations, substitutions, and equivalents will occur to those skilled in the art without departing from the spirit and scope of the present invention as defined by the following claims. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims.

What is claimed is:

1. An imaging system, comprising:
   one or more laser sources configured to produce one or more light beams;
   a light modulator configured to produce images with the one or more light beams; and
   a birefringent wedge that is: configured to receive light from the at least one of the one or more laser sources and deliver two angularly separated light beams to the light modulator so as to reduce speckle appearing when the images are displayed on a display surface;
   wherein the one or more laser sources comprises at least a green laser source, wherein the birefringent wedge is disposed between the green laser source and the light modulator along an optical axis;
   one or more optical alignment devices configured to orient the one or more light beams into a combined light beam, wherein the birefringent wedge is disposed between the one or more optical alignment devices and the light modulator; and
   a second birefringent wedge, wherein the one or more laser sources further comprises a red laser source, wherein the one or more optical alignment devices comprises a first optical alignment device disposed between the green laser source and the light modulator along the optical axis and a second optical alignment device disposed between the red laser source and the light modulator along a second optical axis, wherein the birefringent wedge is disposed between the green laser source and the first optical alignment device, and the second birefringent wedge is disposed between the red laser source and the second optical alignment device.

2. The imaging system of claim 1, wherein the two angularly separated light beams are separated by an angle of between 1.5 and 2.0 arc minutes, further wherein the two angularly separated light beams are substantially orthogonally polarized.

3. The imaging system of claim 1, wherein the birefringent wedge is manufactured from crystalline quartz.

4. The imaging system of claim 3, wherein the one or more light beams intersect a first major face of the birefringent wedge at normal incidence.

5. The imaging system of claim 4, wherein the optical axis of the birefringent wedge is oriented in a plane having an angle of between 61.5 and 67.5 degrees with respect to a normal vector of a major face of the birefringent wedge.

6. The imaging system of claim 3, wherein the birefringent wedge is capable of clocking, counterclockwise or clockwise so as to separate the two angularly separated light beams by an angle of between 1.3 and 2.5 arc minutes.

7. The imaging system of claim 1, wherein the birefringent wedge comprises a first major face and a second major face disposed opposite the birefringent wedge relative to the first major face, wherein the second major face is disposed at a wedge angle of between 3.6 and 4.4 degrees relative to the first major face.

8. The imaging system of claim 7, wherein the light from the at least one of the one or more laser sources comprises one of linear polarized light polarized an angle of about 45 degrees relative to a birefringent wedge optical axis along the first major face or circularly polarized light.

9. The imaging system of claim 1, wherein the light modulator comprises a MEMS scanning mirror.

10. The imaging system of claim 1, further comprising a glass wedge disposed between the birefringent wedge and the light modulator, the glass wedge being configured to correct optical path deviation introduced by the birefringent wedge along the optical axis.

11. The imaging system of claim 10, wherein the birefringent wedge and the glass wedge are separated by an air gap.

12. The imaging system of claim 11, wherein one or more of the glass wedge and the birefringent wedge comprises antireflective coating disposed on one or more major faces.

13. The imaging system of claim 10, wherein the birefringent wedge and the glass wedge are coupled together along an interface.

14. The imaging system of claim 1, further comprising a temporal image averaging device configured to alter successive frames of the images created by the light modulator.

* * * * *